No. 874,450. PATENTED DEC. 24, 1907.
A. J. SPICER.
GAS ENGINE.
APPLICATION FILED OCT. 22, 1906.

Witnesses
K. R. Clendening,
Thomas W. McMeans.

Inventor
Andrew J. Spicer,
By Bradford Hood
Attorneys

UNITED STATES PATENT OFFICE.

ANDREW J. SPICER, OF FRANKLIN, INDIANA, ASSIGNOR, BY MENSE ASSIGNMENTS, OF ONE-HALF TO ELMER C. RUSSELL, OF INDIANAPOLIS, INDIANA.

GAS-ENGINE.

No. 874,450.　　　Specification of Letters Patent.　　　Patented Dec. 24, 1907.

Application filed October 22, 1906.　Serial No. 340,011.

*To all whom it may concern:*

Be it known that I, ANDREW J. SPICER, a citizen of the United States, residing at Franklin, in the county of Johnson and State of Indiana, have invented certain new and useful Improvements in Gas-Engines, of which the following is a specification.

The object of my invention is to produce an internal combustion engine of the air cooled type, the construction being such that the cylinder will be kept perfectly cool.

Figure 1:
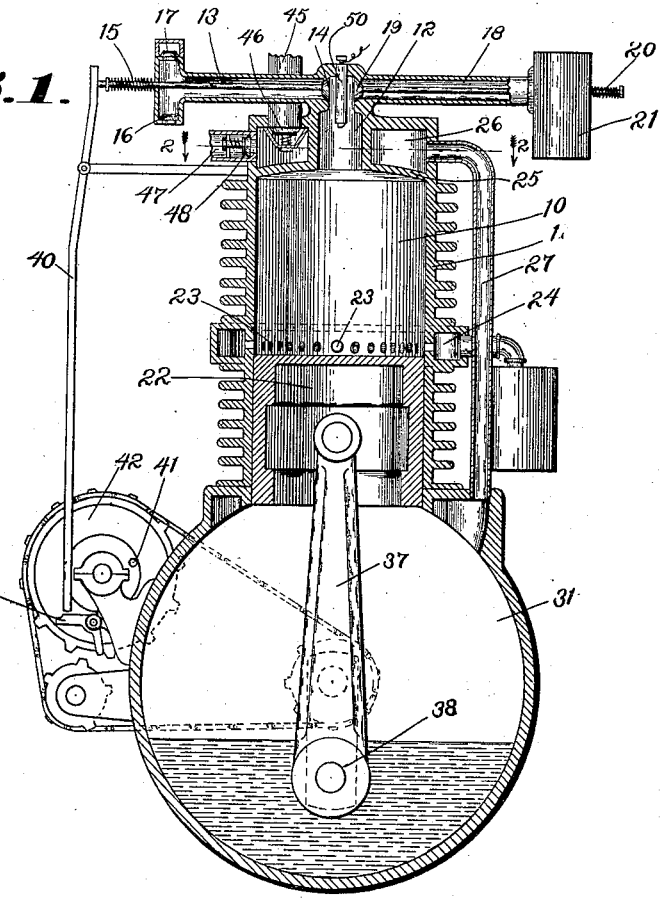
Figure 2:
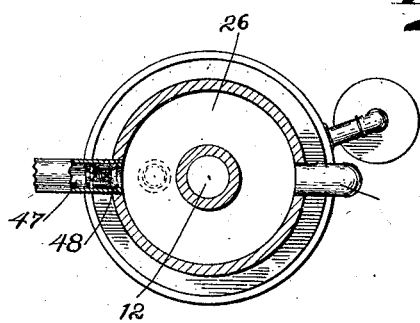

The accompanying drawings illustrate an embodiment of my invention, Figure 1 being a central section, and Fig. 2 a section on line 2—2 of Fig. 1.

In the drawings 10 indicates the combustion chamber of the cylinder 11 which is provided at one end with a comparatively thin head 25 having an inlet passage 12 leading through the center thereof, said passage 12 being of such size that it serves as a compression chamber. Mounted in cylinder 11 is a piston 22 connected by a pitman 37 with a crank 38 of the crank shaft. Formed above the thin head 25 and surrounding the walls of passage 12, is an annular cooling chamber 26 which is connected, at one side of passage 12, by a pipe 27 with the crank base 31. Leading into chamber 26 at a point diametrically opposite pipe 27 is an air inlet 45 provided with an inwardly opening valve 46. Leading from chamber 26, at a point substantially diametrically opposite pipe 27, and discharging in a direction different from the inlet end of pipe 45, is a discharge pipe 47 having an outwardly opening valve 48.

Leading into passage 12 is a fuel supply pipe 18 having an inwardly opening valve 19 therein, said valve being normally held closed by a light spring 20 in a well known manner. A carbureter 21 is connected to the pipe 18 in any well known manner where liquid fuel is used. The said carbureter may be omitted where gas fuel is used. Leading from the combustion chamber 10 at the further end of the stroke of the piston 22, are exhaust ports 23 which lead into an exhaust passage 24, in a well known manner.

The operation of the device thus far described is as follows: A downward movement of piston 22 draws a charge in through pipe 18 past valve 19 and through passage 12 into the combustion chamber, and a return stroke of the piston compresses the charge within passage 12 so that it may be fired by the usual firing means, such as a spark plug 50. A considerable proportion of heat generated by this action is absorbed by the head 25 and walls of the passage 12 and the upward movement of the piston 22 draws a charge of cool, fresh air through pipe 45 into chamber 26 and down through pipe 27 into the crank base 31, this stream of fresh air dividing around the walls of passage 12 and cooling that side which is nearest the inlet more than the further side. On the downward or power stroke of the piston, however, the air which has been drawn into the crank base 31 is discharged back through pipe 27 and chamber 26, again dividing around the walls of passage 12 and passing outward through the pipe 47 past valve 48 thereof, thus cooling the other side of the walls of passage 12 and being discharged at a point distant from the inlet 45 so that, upon the next upward stroke of the piston the air which will be drawn into the pipe 45 will be fresh and cool instead of being partly composed of the heated air which has just been discharged from pipe 47.

It is also desirable, especially in the larger sizes, to provide means for cooling the combustion chamber internally, and for this purpose I provide an air passage 13 which leads into passage 12 and is guarded at its inner end by an inwardly opening valve 14 normally held closed by a spring 15 which is stronger than the spring 20. Leading into passage 13 is an inlet passage guarded by an inwardly opening valve 16, and leading from said passage 13 is a discharge passage guarded by an outwardly opening valve 17, said inlet and outlet passages being divergent so that the supply drawn in through valve 16 will not be composed in part of the most recently exhausted gases passing outward through valve 17. In order to operate valve 14 I provide a lever 40, one end of which is adapted to engage the stem of valve 14 while the other end is arranged in the path of movement of the pin 41 carried by the shaft of a sprocket wheel 42 driven from the crank shaft, as shown, the arrangement being such that every other revolution of the crank shaft will cause a reciprocation of lever 40 which will serve to open valve 14.

The operation of this mechanism is as follows: With the parts in position, as shown in the drawing, a suction stroke of the piston has just been accomplished so that an upward stroke of the piston will produce a compression. At the end of the explosion stroke a portion of the spent gases will be discharged in the usual manner through the exhaust ports 23 and just as said exhaust ports are uncovered pin 41 will come into engagement with lever 40 so as to open valve 14, and there will be at this point, due to the movement of the spent gases through the exhaust ports 23, a slight inrush of air past valve 14. This valve 14 is held open during the next upward stroke of the piston so that all of the spent gases are driven out through passage 13 and past valve 16. If the speed of the engine is normal the valve will be closed just prior to the next downward stroke of the piston but if the speed be too high a lever 44 operated by a speed-controlled governor (not shown), will be thrown into the path of movement of the lever 40 so as to hold it against closure during the next downward and upward stroke of the piston so that a charge of air, instead of fuel, will be drawn in past valve 16 through passage 13 to the combustion chamber, thus cooling said chamber and thoroughly flushing same, said air charge being entirely free from the recently discharged spent gases which have passed valve 17.

I claim as my invention:

1. In a gas engine, the combination, with a combustion chamber having a smaller tubular extension, and a piston mounted in said chamber, of a cooling chamber surrounding the tubular extension, said cooling chamber having a valved inlet and outlet communicating with said chamber at one side of the tubular extension, and a passage forming a communication between that side of the piston opposite the combustion chamber and the cooling chamber at that side of the tubular extension opposite the inlet and outlet, whereby a cooling stream of air is propelled in alternately opposite directions through the cooling chamber, said cooling stream of air being divided and deflected by the tubular extension.

2. In a gas engine, the combination, with a cylinder having a smaller tubular extension, and a piston mounted in said cylinder dividing the same into a combustion chamber communicating with the tubular extension, and a circulation chamber, of a cooling chamber surrounding the tubular extension and having an inlet and outlet communicating with said cooling chamber at one side of the tubular extension, a passage extending from the cooling chamber, at a point on the other side of the tubular extension, to the circulation chamber, a fuel inlet leading into the combustion chamber, an air inlet leading into the combustion chamber, a normally closed valve arranged in said air inlet, and means for alternately opening said last mentioned valve intermittently, substantially as and for the purpose set forth.

3. In a gas engine, the combination, with a cylinder having a smaller tubular extension, and a piston mounted in said cylinder dividing the same into a combustion chamber communicating with the tubular extension, and a circulation chamber, of a cooling chamber surrounding the tubular extension and having an inlet and outlet provided with suitable valves and having their outer ends at separated points, said inlet and outlet communicating with said cooling chamber at one side of the tubular extension, a passage extending from the cooling chamber, at a point on the other side of the tubular extension, to the circulation chamber, a fuel inlet leading into the combustion chamber, an air inlet leading into the combustion chamber, a normally closed valve arranged in said air inlet, means for opening said last mentioned valve intermittently, said air inlet passage having valved inlet and outlet branches with outer ends separated, substantially as and for the purpose set forth.

In witness whereof, I, have hereunto set my hand and seat at Indianapolis, Indiana, this 18" day of October, A. D. one thousand nine hundred and six.

ANDREW J. SPICER. [L. S.]

Witnesses:
ARTHUR M. HOOD,
THOMAS W. McMEANS.